United States Patent
Oya et al.

(10) Patent No.: US 9,321,374 B2
(45) Date of Patent: Apr. 26, 2016

(54) VEHICLE SEAT SLIDE DEVICE

(71) Applicant: Aisin Seiki Kabushiki Kaisha, Kariya-shi (JP)

(72) Inventors: Tsutomu Oya, Kariya (JP); Koichi Morita, Kariya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 14/541,503

(22) Filed: Nov. 14, 2014

(65) Prior Publication Data

US 2015/0129737 A1 May 14, 2015

(30) Foreign Application Priority Data

Nov. 14, 2013 (JP) ................................. 2013-236294

(51) Int. Cl.
*B60N 2/07* (2006.01)
*B60N 2/68* (2006.01)
*B60N 2/06* (2006.01)

(52) U.S. Cl.
CPC .............. *B60N 2/0722* (2013.01); *B60N 2/062* (2013.01); *B60N 2/0732* (2013.01); *B60N 2/682* (2013.01)

(58) Field of Classification Search
CPC .... B60N 2/0722; B60N 2/062; B60N 2/0732; B60N 2/682; B60N 2/073; B60N 2/688; B60N 2/0705; B60R 22/26
USPC ........................................ 248/429; 296/65.13
See application file for complete search history.

(56) References Cited

U.S. PATENT DOCUMENTS

| 6,176,460 | B1 * | 1/2001 | Kojima | B60N 2/0705 248/429 |
| 6,264,159 | B1 | 7/2001 | Su | |
| 6,405,987 | B1 * | 6/2002 | Andrigo | B60N 2/0705 248/429 |
| 8,245,994 | B2 | 8/2012 | Yamada et al. | |
| 8,251,428 | B2 | 8/2012 | Yamada et al. | |
| 2002/0101104 | A1 | 8/2002 | Niikura | |
| 2004/0232303 | A1 | 11/2004 | Rausch et al. | |

(Continued)

FOREIGN PATENT DOCUMENTS

| CN | 202966010 U | 6/2013 |
| DE | 201 15 164 U1 | 2/2002 |

(Continued)

OTHER PUBLICATIONS

Extended European Search Report issued Apr. 7, 2015 in Patent Application No. 14193069.3.

*Primary Examiner* — Anita M King
(74) *Attorney, Agent, or Firm* — Oblon, McClelland, Maier & Neustadt, L.L.P

(57) ABSTRACT

A vehicle seat slide device includes: an upper rail including a bracket support having side walls and an upper wall connecting upper ends of the side walls; a lower rail supporting the upper rail so as to be relatively movable; and a bracket fixed to the bracket support. A cutout portion open upward is formed in the bracket support, a nut member which can be screwed to a bolt inserted into the bracket support via a terminal of the bracket support is disposed in the cutout portion, the bracket includes first and second vertical walls having an insertion hole into which the bolt is inserted, and which oppose each other, the first vertical wall is fixed to the terminal, and the second vertical wall is arranged inside the cutout portion at a position where the nut member is interposed between the first and second vertical walls.

8 Claims, 12 Drawing Sheets

(56) References Cited

U.S. PATENT DOCUMENTS

| | | |
|---|---|---|
| 2010/0187397 A1 | 7/2010 | Yamada et al. |
| 2013/0248675 A1* | 9/2013 | Ewald ............ B60N 2/0705 248/430 |
| 2015/0001366 A1* | 1/2015 | Nakashima ........ B60N 2/0843 248/429 |

FOREIGN PATENT DOCUMENTS

| | | | |
|---|---|---|---|
| EP | 1 228 922 | A1 | 8/2002 |
| EP | 2 213 504 | A2 | 8/2010 |
| EP | 2 213 505 | A2 | 8/2010 |
| FR | 2 930 203 | A1 | 10/2009 |
| JP | 6-6074 | U | 1/1994 |
| JP | 2004-90765 | A | 3/2004 |
| JP | 2008-285098 | | 11/2008 |
| JP | 2009-292166 | | 12/2009 |
| JP | 2010-173487 | | 8/2010 |
| JP | 2010-173491 | | 8/2010 |
| JP | 2010-173496 | | 8/2010 |

* cited by examiner

VEHICLE SEAT SLIDE DEVICE

CROSS REFERENCE TO RELATED APPLICATIONS

This application is based on and claims priority under 35 U.S.C. §119 to Japanese Patent Application 2013-236264, filed on Nov. 14, 2013, the entire contents of which are incorporated herein by reference.

TECHNICAL FIELD

This disclosure relates to a vehicle seat slide device.

BACKGROUND DISCUSSION

In the related art, there is provided a vehicle seat slide device in which an upper rail thereof includes a bracket support having a pair of side walls and an upper wall connecting the respective side walls to each other.

For example, in a seat slide device disclosed in JP 2010-173487A (Reference 1), an upper wall thereof and each vertical wall are cut out. In this manner, a slit-shaped cutout portion which is open upward is formed in a bracket support of the upper rail. In addition, a nut member which can be screwed to a bolt inserted into the bracket support via a terminal of the bracket support is disposed inside the upper rail. Furthermore, a bracket includes a pair of vertical walls having an insertion hole into which the bolt is inserted and opposing each other. One side of the respective vertical walls is arranged at a position in contact with the terminal, and the other side is arranged inside the cutout portion. Then, this seat slide device has a configuration in which both vertical walls are interposed therebetween in an axial direction of the bolt based on a fastening force of the bolt screwed into the nut member so that the bracket is fixed to the upper rail.

However, in the configuration in which two vertical walls are interposed between the bolt and the nut as in the related art, there is a possibility that the respective vertical walls may be deflected due to the fastening force and a narrowed gap between both of these causes the bracket to tilt in the axial direction of the bolt. Then, this may cause a possibility that support rigidity of a seat may deteriorate. In this regard, there is still room for improvement.

SUMMARY

Thus, a need exists for a vehicle seat slide device which is not suspectable to the drawback mentioned above.

An aspect of this disclosure is directed to a vehicle seat slide device including an upper rail that includes a bracket support having a pair of side walls and an upper wall connecting upper ends of the respective side walls, a lower rail that supports the upper rail so as to be relatively movable, and a bracket that is fixed to the bracket support. A cutout portion which is open upward is formed in the bracket support by cutting out the upper wall and the respective side walls. A nut member which is screwed to a bolt inserted into the bracket support via a terminal of the bracket support is disposed in the cutout portion. The bracket includes first and second vertical walls which have an insertion hole into which the bolt is inserted, and which oppose each other. The first vertical wall is fixed to the terminal of the bracket support, based on a fastening force of the bolt screwed into the nut member. The second vertical wall is arranged inside the cutout portion at a position where the nut member is interposed between the first vertical wall and the second vertical wall.

According to the above-described configuration, it is possible to reduce a possibility that the respective vertical walls may be deflected due to the fastening force of the bolt. As a result, both the vertical walls do not tilt, and the bracket can be properly erected on the bracket support of the upper rail. Then, this can ensure improved support rigidity. In addition, since the nut member is fixed to the bracket support, it is possible to reduce a possibility that contact noise may be generated between the upper rail and the nut member as observed in the related art. Then, this can provide improved quality.

According to the aspect of this disclosure, it is possible to ensure more improved support rigidity.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment relating to a vehicle seat slide device will be described with reference to the drawings.

Figure 1:
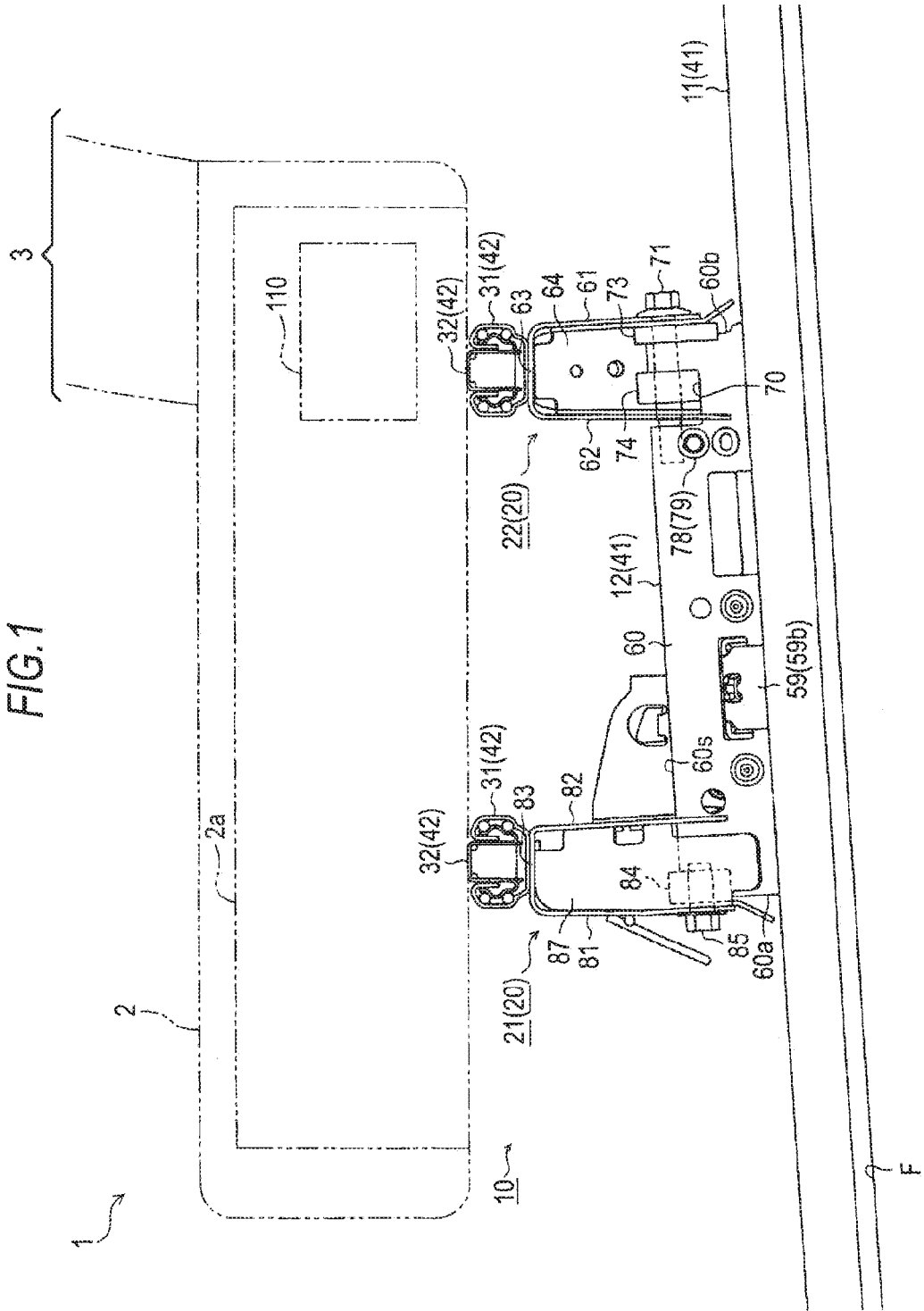
FIG. 1 is a side view of a seat slide device.

As illustrated in FIG. 1, a vehicle seat 1 includes a seat cushion 2 and a seatback 3 disposed to be tiltable with respect to a rear end portion of the seat cushion 2. Then, the seat 1 is supported on a floor F of a vehicle via a seat slide device 10.

Figure 2:
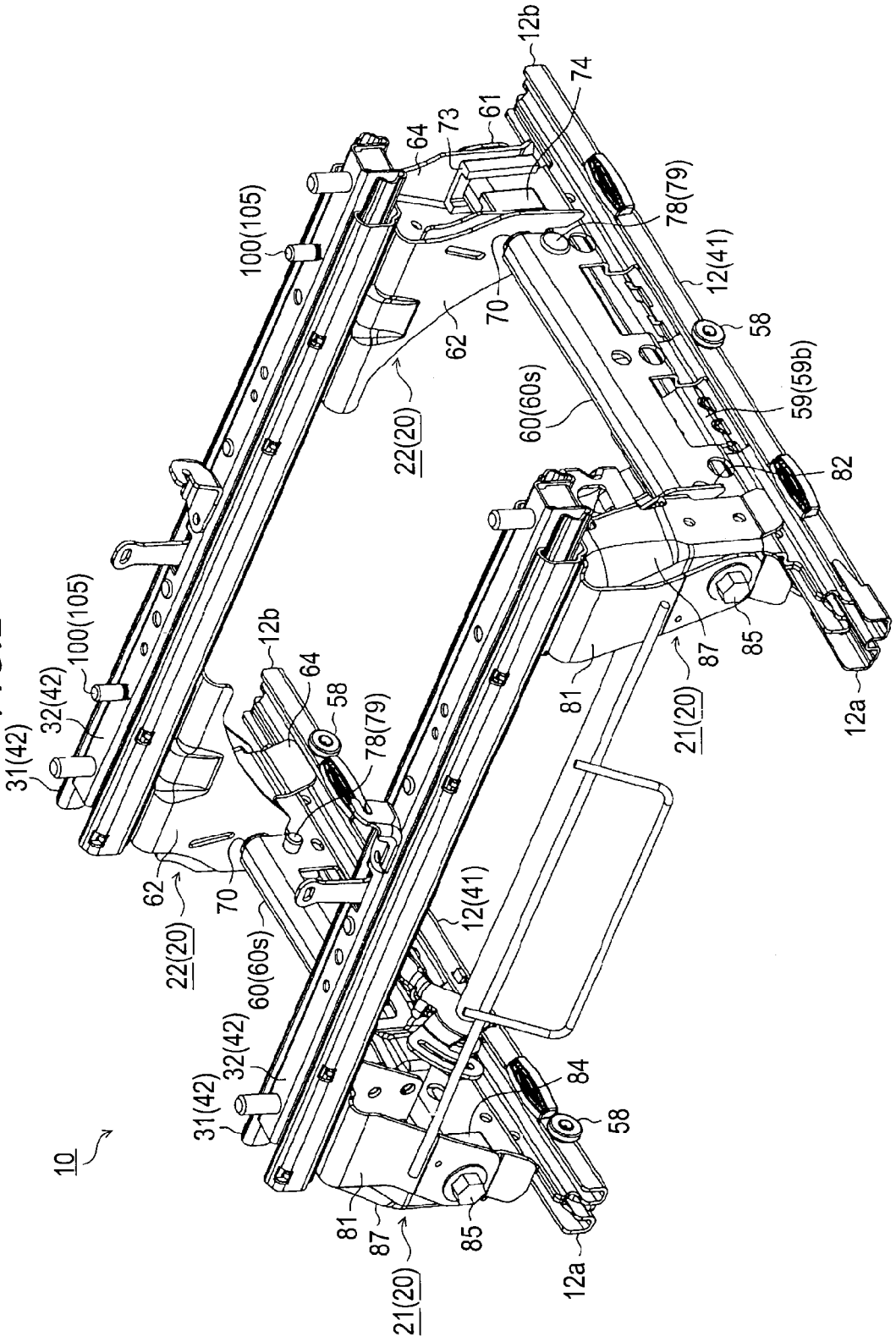
FIG. 2 is a perspective view of the seat slide device.
Figure 3:
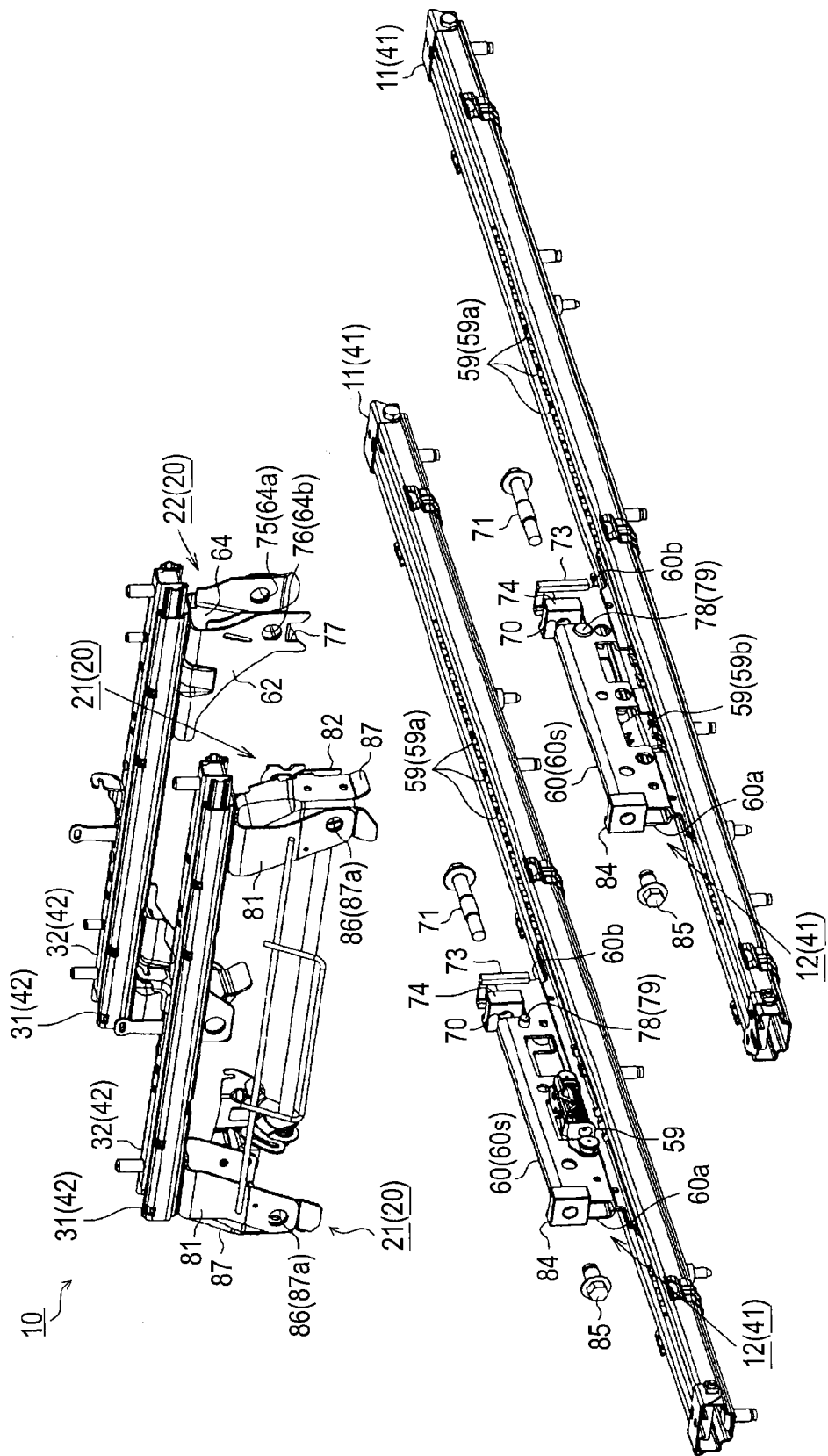
FIG. 3 is an exploded perspective view of the seat slide device.

Specifically, as illustrated in FIGS. 1 to 3, two lower rails 11 extending in a vehicle longitudinal direction are disposed side by side in parallel on the floor F of the vehicle. In addition, upper rails 12 which are movable on the respective lower rails 11 are respectively mounted on the lower rails 11. Then, brackets 20 (21 and 22) are respectively fixed onto the respective upper rails 12.

In particular, the seat slide device 10 of the embodiment disclosed here includes a front bracket 21 which is supported by the upper rail 12 at a position on a front side of a vehicle and a rear bracket 22 which is supported by the upper rail 12 at a position on a rear side of the vehicle. In addition, second lower rails 31 extending in a vehicle width direction are respectively laid between the front brackets 21 and the rear brackets 22 which are disposed in the right and left upper rails 12. Furthermore, second upper rails 32 which are movable on the respective second lower rails 31 are mounted on the second lower rails 31. Then, in the embodiment disclosed here, a seat frame 2a is fixed to the second upper rails 32.

In this manner, the seat slide device 10 of the embodiment disclosed here includes a first slide rail 41 and a second slide rail 42 which are arranged in a grid pattern. Thus, this can allow adjustment of a seat position in the vehicle longitudinal direction and the vehicle width direction.

That is, the upper rail 12 moves on the lower rail 11, thereby enabling the first slide rail 41 to adjust a position of the seat 1 in the vehicle longitudinal direction. Then, the second upper rail 32 moves on the second lower rail 31 extending in the vehicle width direction, thereby enabling the second slide rail 42 to adjust the position of the seat 1 in the vehicle width direction.

Next, a configuration of the first slide rail 41 will be described.

In the embodiment disclosed here, the lower rail 11 and the upper rail 12 which configure the first slide rail 41 are respectively formed through a bending process of a plate material.

Figure 4:
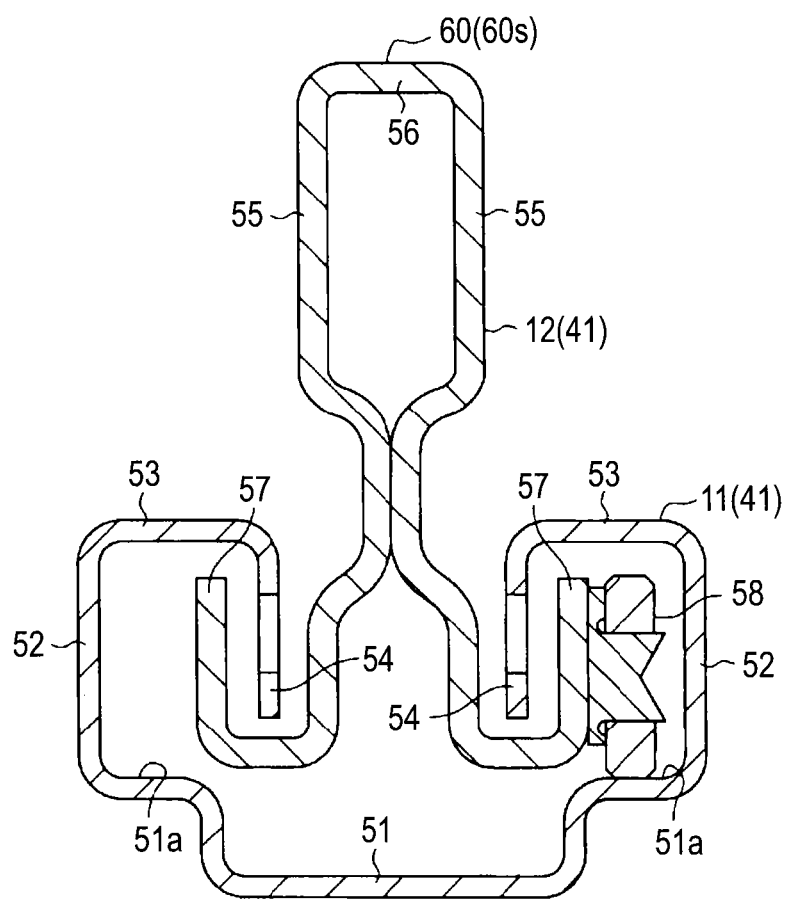
FIG. 4 is a cross-sectional view of a first slide rail.

Specifically, as illustrated in FIG. 4, the lower rail 11 includes a bottom wall 51 extending in the vehicle longitudinal direction (in FIG. 4, a direction orthogonal to the paper). In addition, outer walls 52 are respectively erected in both ends in a width direction (in each drawing, a rightward-leftward direction) of the bottom wall 51. Furthermore, flange-shaped upper walls 53 folded inward in the width direction are respectively formed in an upper end of the outer walls 52. Then, inner walls 54 opposing each other in the width direction are formed in a distal end of the respective upper walls 53 with a predetermined distance therebetween by being respectively folded downward.

In contrast, the upper rail 12 includes a pair of side walls 55 extending in a vertical direction between both the inner walls 54 of the lower rail 11, and an upper wall 56 connecting the respective side walls 55 above the respective side walls 55.

In addition, the upper rail 12 includes folded portions 57 which are arranged inside a space surrounded by the outer walls 52, the upper wall 53, and the inner walls 54 on the lower rail 11 side by being folded upward from a lower end of the respective side walls 55. Then, multiple wheels 58 which come into contact with a track 51a disposed on the respective bottom walls 51 on the lower rail 11 side and which roll on the track 51a are respectively disposed in the folded portions 57 (refer to FIG. 3).

That is, the wheels 58 disposed in the respective folded portions 57 roll, thereby causing the upper rail 12 of the embodiment disclosed here to move on the lower rail 11 in a state where the wheels 58 travel on the track 51a in contact therewith. In addition, the respective folded portions 57 are surrounded by the outer walls 52, the upper wall 53, and the inner walls 54. In this manner, a relative movement of the upper rail 12 is regulated in an upward direction and the width direction with respect to the lower rail 11. Then, in the embodiment disclosed here, this can stably maintain a positional relationship between the lower rail 11 and the upper rail 12.

As illustrated in FIGS. 1 to 3, the seat slide device 10 of the embodiment disclosed here includes a locking mechanism 59 which can regulate the relative movement between the lower rail 11 and the upper rail 12. The locking mechanism 59 of the embodiment disclosed here has a known configuration in which a locking lever 59b disposed in the upper rail 12 is engaged with or disengaged from engagement portions (engagement holes) 59a formed side by side in a row along an extending direction of (the inner wall 54 of) the lower rail 11. Then, in the embodiment disclosed here, based on an operation of the locking mechanism 59, it is possible to switch between a locked state where the relative movement is regulated between the lower rail 11 and the upper rail 12 and an unlocked state where the relative movement is allowed.

In addition, in the seat slide device 10 of the embodiment disclosed here, the upper rail 12 has a shape where both the side walls 55 and the upper wall 56 which configure the upper rail 12 are largely cut out in a front end portion 12a and a rear end portion 12b thereof. Then, the upper rail 12 of the embodiment disclosed here has a configuration in which both the side walls 55 and the upper wall 56 which remain in a center portion thereof serve as a bracket support 60 so as to support the respective brackets 20 (21 and 22) upward.

Fixing Structure of Bracket

Next, a fixing structure of the respective brackets 20 with respect to the upper rail 12 will be described.

Figure 5:
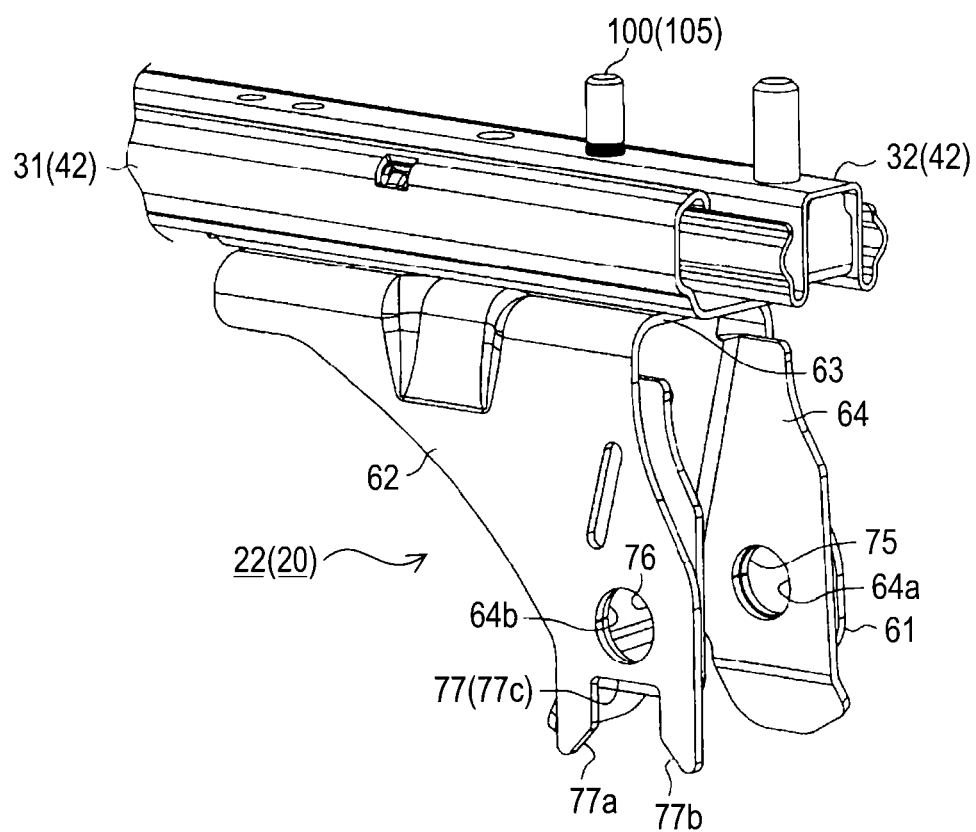
FIG. 5 is a perspective view of a rear bracket and a second slide rail supported by the rear bracket.
Figure 6:
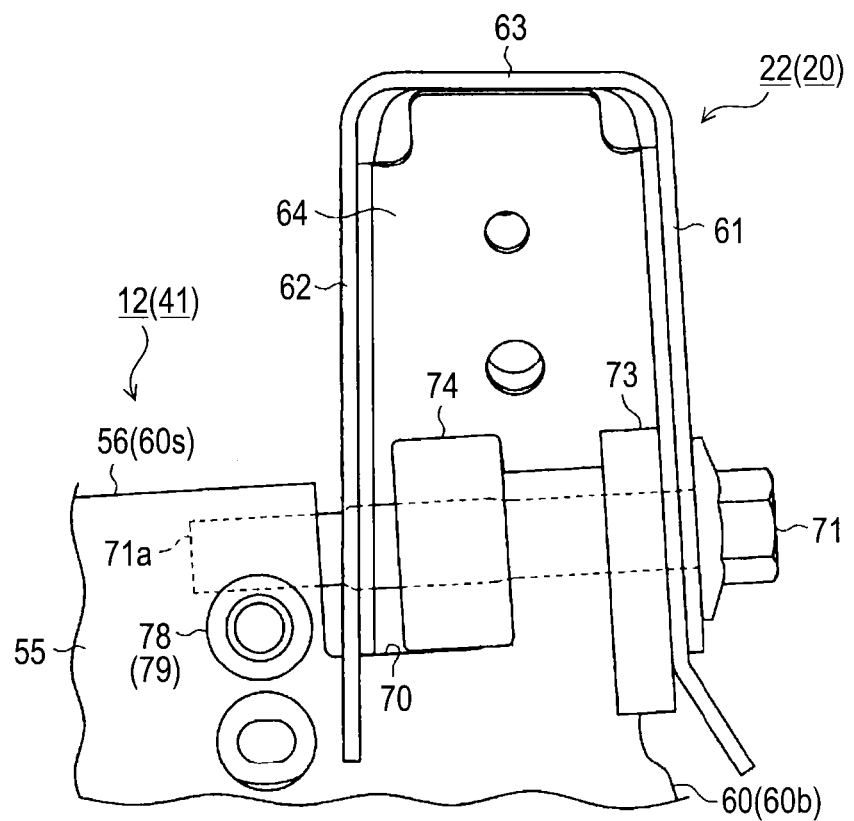
FIG. 6 is a side view illustrating the vicinity of the rear bracket.
Figure 7:
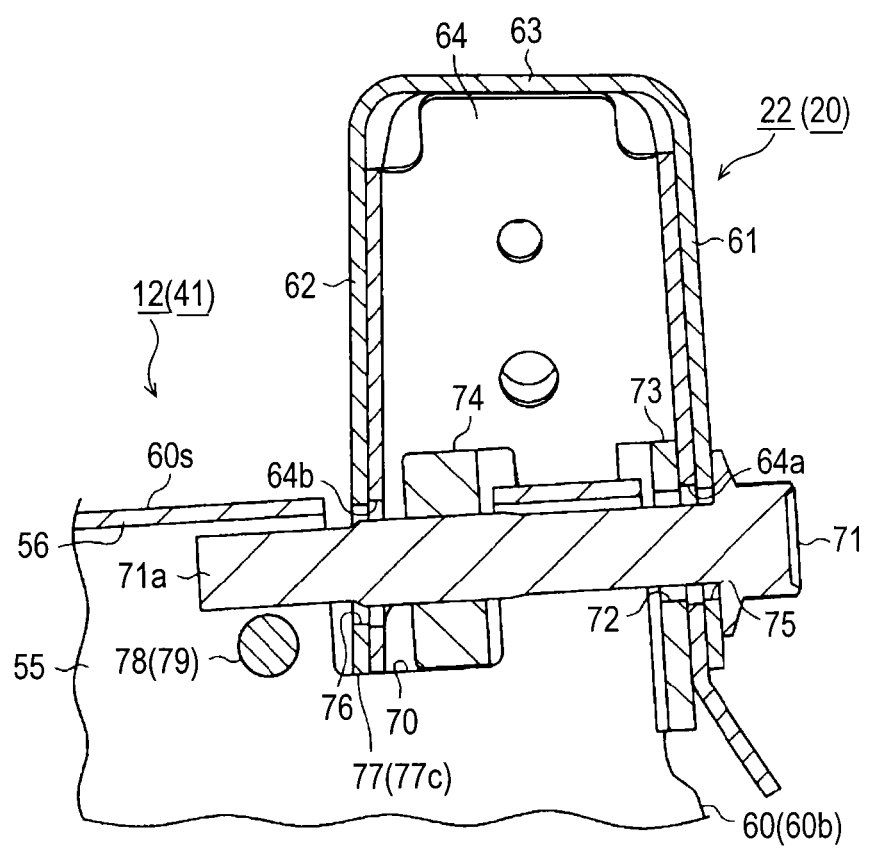
FIG. 7 is a cross-sectional view illustrating the vicinity of the rear bracket.

As illustrated in FIGS. 5 to 7, in the seat slide device 10 of the embodiment disclosed here, the rear bracket 22 includes first and second vertical walls 61 and 62 opposing each other, and an upper wall 63 connecting upper ends of both vertical walls 61 and 62. That is, the rear bracket 22 is configured so that both vertical walls 61 and 62 are fixed to the bracket support 60 of the upper rail 12. The rear bracket 22 of the embodiment disclosed here includes a cover 64 which comes into contact with both the vertical walls 61 and 62, which has a substantially U-shaped cross section, and which is arranged on a side of the bracket support 60. Then, in the embodiment disclosed here, the second lower rail 31 configuring the second slide rail 42 on the rear side of the vehicle (refer to FIG. 1, right side) is fixed above the upper wall 63.

Specifically, in the upper rail 12 of the embodiment disclosed here, a cutout portion 70 which is open upward is formed near a rear end 60b of the bracket support 60 by cutting out an upper end portion of the upper wall 56 and both the side walls 55 which configure the bracket support 60. In addition, a plate-shaped terminal plate 73 having an insertion hole 72 into which a bolt 71 can be inserted is disposed in the rear end 60b of the bracket support 60. In the embodiment disclosed here, the terminal plate 73 is fixed to the rear end 60b of the bracket support 60 in advance by means of welding. Furthermore, a nut member 74 which can be screwed to the bolt 71 inserted into the bracket support 60 from the rear end 60b side (in FIGS. 6 and 7, right side) via the insertion hole 72 of the terminal plate 73 is disposed in the cutout portion 70. Then, the rear bracket 22 of the embodiment disclosed here is configured so that both vertical walls 61 and 62 are fixed to the bracket support 60, based on a fastening force between the bolt 71 and the nut member 74.

To be more specific, in the embodiment disclosed here, the nut member 74 is fixed at a position on the rear side of the vehicle, inside the cutout portion 70, by means of welding. In addition, insertion holes 75 and 76 into which the bolt 71 can be inserted are respectively formed on both vertical walls 61 and 62 of the rear bracket 22. Then, in the embodiment disclosed here, insertion holes 64a and 64b are also respectively formed at a position corresponding to the respective insertion holes 75 and 76, in the cover 64 which has a substantially U-shaped cross section and comes into contact with both vertical walls 61 and 62.

In the embodiment disclosed here, the first vertical wall 61 is arranged at a position in contact with the terminal plate 73 disposed in the rear end 60b of the bracket support 60. The second vertical wall 62 is arranged at a position where the nut member 74 is interposed between the first vertical wall 61 and the second vertical wall 62, inside the cutout portion 70, that is, on the front end 60a side (in FIG. 6, left side) of the bracket support 60 from the nut member 74. Then, the bolt 71 screwed into the nut member 74 is fastened, thereby causing the first vertical wall 61 to be fastened to the rear end 60*b* of the bracket support 60.

Figure 8:
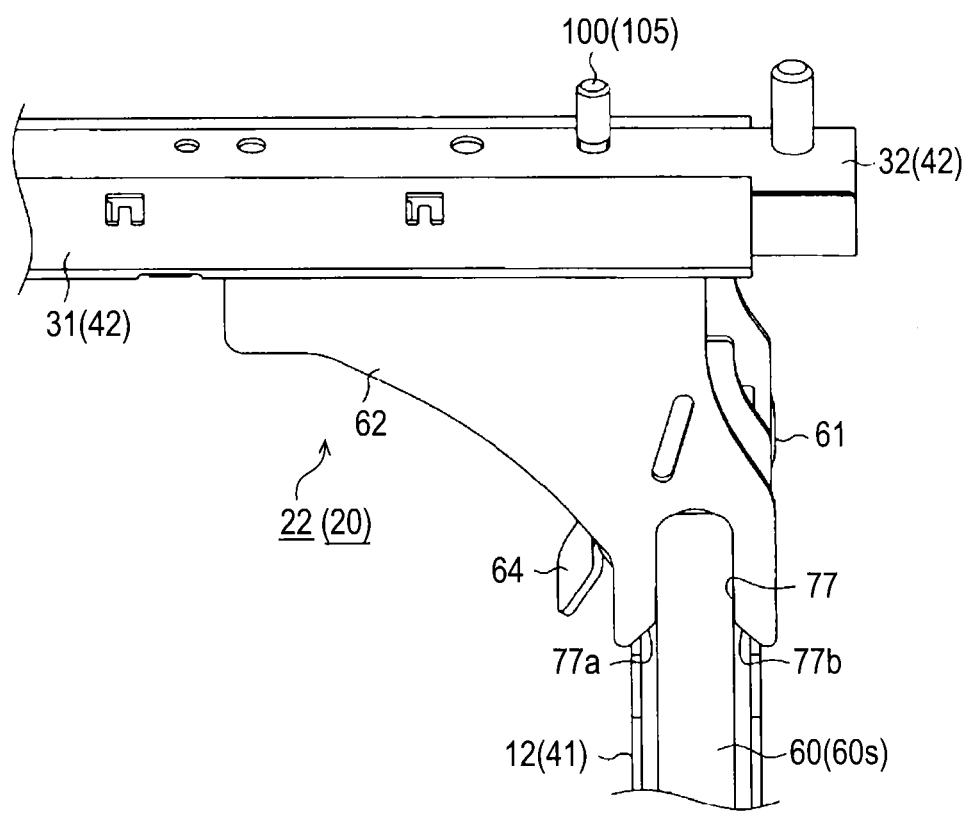
FIG. 8 is a perspective view illustrating the vicinity of the rear bracket.

As illustrated in FIGS. 5 and 8, in the embodiment disclosed here, a cutout portion 77 which has a flared shape of widening toward an opening side and which is open to the lower end is formed on the second vertical wall 62. Specifically, the cutout portion 77 of the embodiment disclosed here has a pair of slopes 77*a* and 77*b* having a substantially flared shape near the lower end of the second vertical wall 62 which serves as an opening side thereof. Then, as illustrated in FIGS. 6 to 8, the second vertical wall 62 is fixed to the bracket support 60 in a state where the bracket support 60 is inserted into the cutout portion 77, more specifically, in a state where a bottom 77*c* of the cutout portion 77 is in contact with a bottom (cutout surface) of the cutout portion 70 formed in the bracket support 60.

In addition, as illustrated in FIGS. 6 and 7, the upper rail 12 of the embodiment disclosed here has a support 78 which can support the bolt 71 screwed into the nut member 74 from below, on the front side of the vehicle from the nut member 74 disposed in the cutout portion 70, that is, at a position away from the rear end 60*b* of the bracket support 60 to which the first vertical wall 61 is fixed. In the embodiment disclosed here, in a state of penetrating both side walls 55 of the upper rail 12, the support 78 is formed by laying a through-pin 79 serving as a shaft-shaped member between both the side walls 55. The through-pin 79 is normally disposed at a lower position which is not in contact with the bolt 71. Then, in this manner, even when a force applied to such an extent that the distal end 71*a* side is pressed downward acts on the bolt 71, the support 78 of the embodiment disclosed here is configured so that the support 78 can support the distal end 71*a* side of the bolt 71 from below.

Next, a fixing structure of the front bracket 21 will be described.

Figure 9:
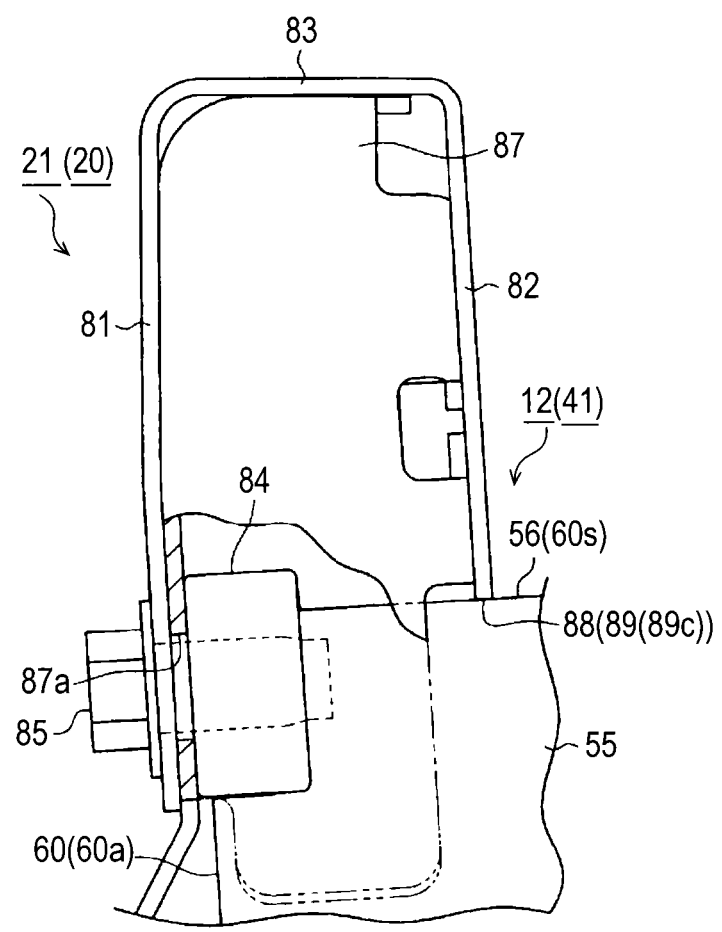
FIG. 9 is a side view illustrating the vicinity of a front bracket.
Figure 10:
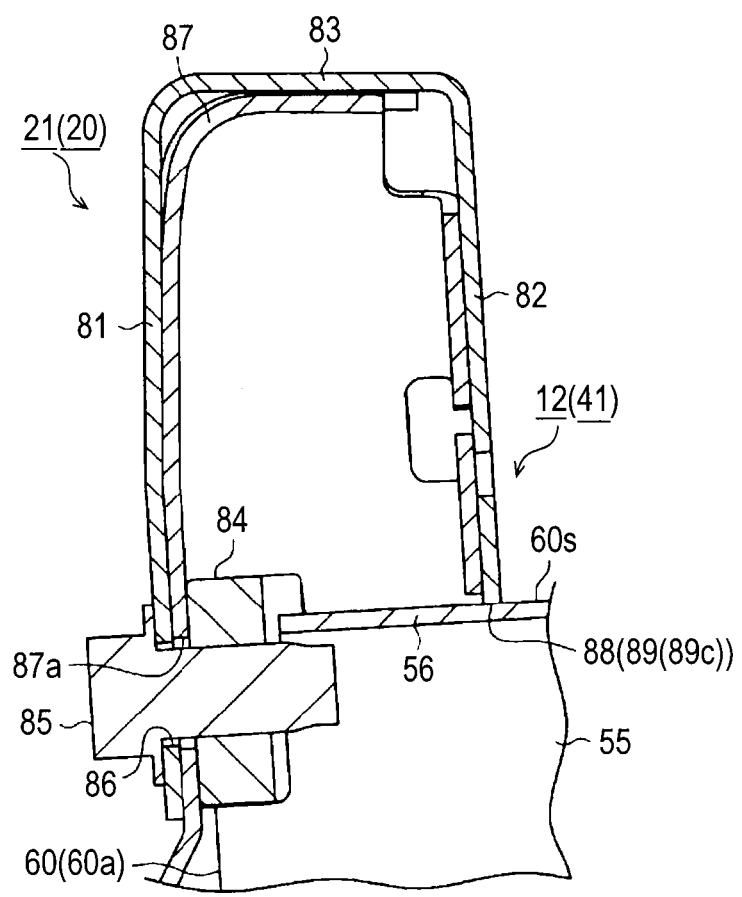
FIG. 10 is a cross-sectional view illustrating the vicinity of the front bracket.

As illustrated in FIGS. 3, 9, and 10, similar to the rear bracket 22, the front bracket 21 of the embodiment disclosed here includes third and fourth vertical walls 81 and 82 opposing each other and an upper wall 83 connecting upper ends of both vertical walls 81 and 82. That is, the front bracket 21 is also configured so that both the vertical walls 81 and 82 are fixed to the bracket support 60 of the upper rail 12. Then, in the embodiment disclosed here, the second lower rail 31 configuring the second slide rail 42 on the front side of the vehicle (refer to FIG. 1, left side) is fixed above the upper wall 83.

Specifically, in the embodiment disclosed here, a second nut member 84 is disposed in the front end 60*a* of the bracket support 60. In addition, in the front bracket 21 of the embodiment disclosed here, an insertion hole 86 into which a second bolt 85 fixedly screwed into the second nut member 84 is formed on the third vertical wall 81. Then, in the front bracket 21 of the embodiment disclosed here, the second bolt 85 fixedly screwed into the second nut member 84 is fastened. In this manner, the third vertical wall 81 is fastened to the front end 60*a* of the bracket support 60.

In the embodiment disclosed here, the second nut member 84 is fixed to the front end 60*a* of the bracket support 60 in advance by means of welding. In addition, similar to the rear bracket 22, a cover 87 which comes into contact with both vertical walls 81 and 82, which has a substantially U-shaped cross section, and which is arranged on a side of the bracket support 60 is also disposed in the front bracket 21. Then, an insertion hole 87*a* disposed on the third vertical wall 81 is also formed in the cover 87.

In addition, in the front bracket 21 of the embodiment disclosed here, a contact portion 88 which comes into contact with an upper surface 60*s* of the bracket support 60 is disposed on the fourth vertical wall 82.

Figure 11:
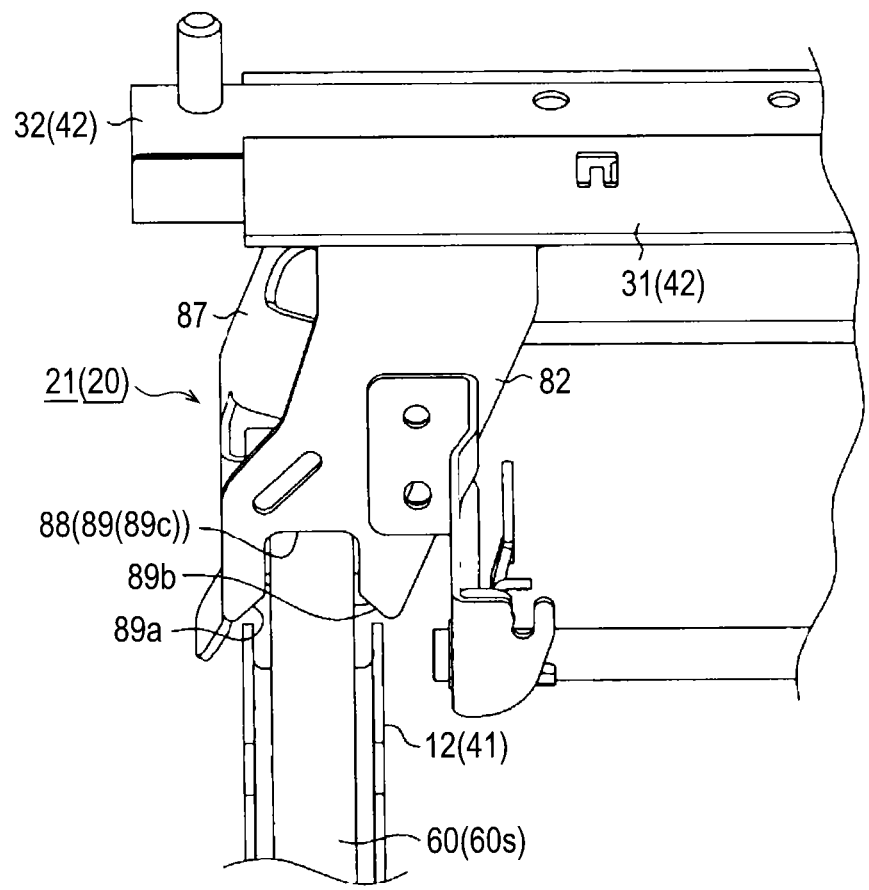
FIG. 11 is a perspective view illustrating the vicinity of the front bracket.

Specifically, as illustrated in FIG. 11, in the embodiment disclosed here, similar to the cutout portion 77 (refer to FIG. 5) disposed on the second vertical wall 62 in the rear bracket 22, a cutout portion 89 which has a flared shape of widening toward an opening side thereof and which is open to the lower end is formed on the fourth vertical wall 82. The cutout portion 89 also has a pair of slopes 89*a* and 89*b* having a substantially flared shape near the lower end of the fourth vertical wall 82 which serves as an opening side thereof. Then, as illustrated in FIGS. 9 to 11, in the second vertical wall 62, the bracket support 60 is inserted into the cutout portion 89. In this manner, a bottom 89*c* of the cutout portion 89 is configured to serve as the contact portion 88 with respect to the upper surface 60*s* of the bracket support 60.

Load Transfer Member

Next, a configuration of a load transfer member interposed between the rear bracket 22 and the second upper rail 32 configuring the second slide rail 42 will be described.

Figure 12:
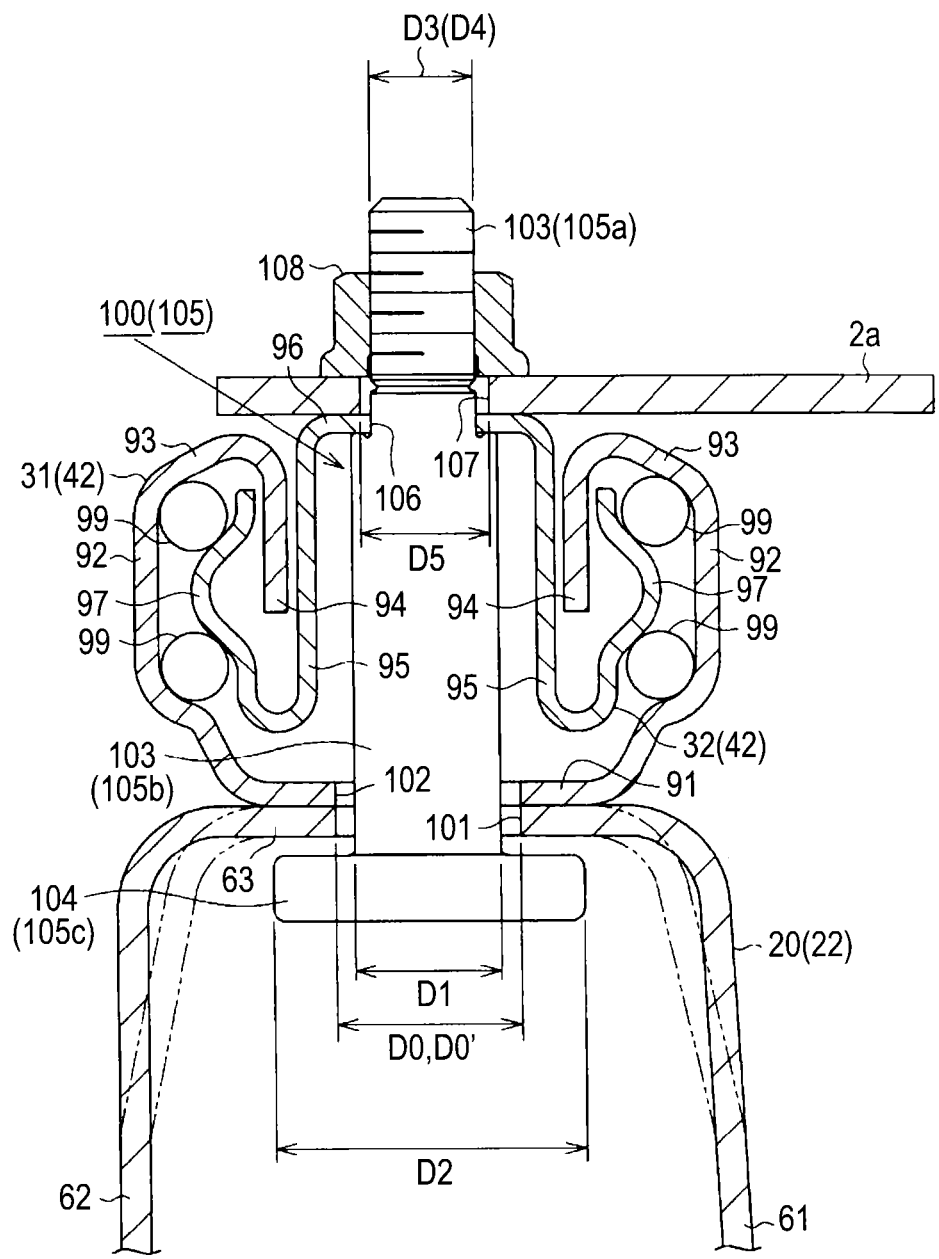
FIG. 12 is a cross-sectional view illustrating the vicinity of a load transfer member interposed between the rear bracket and a second upper rail.

As illustrated in FIG. 12, in the embodiment disclosed here, similar to the lower rail 11 on the first slide rail 41 side, the second lower rail 31 configuring the second slide rail 42 also includes a bottom wall 91, an outer wall 92, an upper wall 93, and an inner wall 94, although shapes thereof are different. Then, the second upper rail 32 also includes a side wall 95, an upper wall 96, and a folded portion 97.

In the second slide rail 42 of the embodiment disclosed here, multiple rolling elements 99 are interposed between the second lower rail 31 and the second upper rail 32. Then, in the embodiment disclosed here, this ensures a smooth relative movement between the second lower rail 31 and the second upper rail 32.

In addition, in the embodiment disclosed here, when a load applied to such an extent that the second upper rail 32 is raised acts on the second upper rail 32, a load transfer member 100 for transferring the load to the rear bracket 22 is disposed between the rear bracket 22 and the second upper rail 32 on the second slide rail 42 side supported by the rear bracket 22.

Specifically, in the embodiment disclosed here, a long hole 101 extending in the extending direction (in FIG. 12, direction orthogonal to the paper) of the second upper rail 32 (and the second lower rail 31) is formed on the upper wall 63 of the rear bracket 22 which supports the second slide rail 42 upward. Furthermore, a long hole 102 which corresponds to and has the same shape as the long hole 101 disposed on the upper wall 63 of the rear bracket 22 is also formed on the bottom wall 91 of the second lower rail 31. Then, the load transfer member 100 of the embodiment disclosed here includes a shaft 103 having a shape which can pass through the respective long holes 101 and 102 and in which one end side is fixed to the upper wall 96 of the second upper rail 32, and a flange 104 disposed on the other end side of the shaft 103 and having a shape which cannot pass through the long hole 101 arranged below the upper wall 63 of the rear bracket 22.

To be more specific, in the embodiment disclosed here, a stepped bolt 105 in which a threaded portion is formed in a small diameter portion 105*a* on the distal end side is used as the load transfer member 100. Specifically, in the stepped bolt 105, an outer diameter D1 of a large diameter portion 105*b* thereof is set to have a smaller value than a groove width D0 of the long hole 101 disposed on the upper wall 63 of the rear bracket 22 (D1<D0). An outer diameter D2 of a bolt head 105*c* thereof is set to have a greater value than the groove width D0 of the long hole 101 (D2>D0). In the embodiment disclosed here, the long hole 102 disposed on the bottom wall 91 of the second lower rail 31 has a groove width D0' which is substantially equal to (slightly larger than) the groove width D0 of the long hole 101 on the rear bracket 22 side (D0≅D0'). In addition, the stepped bolt 105 is inserted into the second upper rail 32 from a lower side of the upper wall 63 of the rear bracket 22 via the long hole 101. Then, the stepped bolt 105 is fixed to the upper wall 96 of the second upper rail 32 by using the threaded portion formed in the small diameter portion 105a.

That is, in the stepped bolt 105 of the embodiment disclosed here, the small diameter portion 105a and the large diameter portion 105b which have a shaft shape configure the shaft 103 of the load transfer member 100. The bolt head 105c having a flange shape configures the flange 104 of the load transfer member 100.

In addition, in the embodiment disclosed here, through-holes 106 and 107 into which the small diameter portion 105a of the stepped bolt 105 is inserted are formed in the upper wall 96 of the second upper rail 32 and the seat frame 2a fixed to the upper wall 96. In the embodiment disclosed here, the small diameter portion 105a of the stepped bolt 105 is inserted into the through-hole 106 (outer diameter D3) formed on the upper wall 96 of the second upper rail 32 by means of press fitting. Furthermore, the large diameter portion 105b of the stepped bolt 105 has an outer diameter which is larger than inner diameters D4 and D5 of the respective through-holes 106 and 107 (D1>D4, D1>D5). Then, a distal end portion of the stepped bolt 105 is fixed to the upper wall 96 of the second upper rail 32 in a state where the seat frame 2a and the upper wall 96 of the second upper rail 32 are co-fastened between a nut 108 and the large diameter portion 105b, based on the fastening force of the nut 108 fixedly screwed to the threaded portion formed in the small diameter portion 105a.

Next, an operation of the load transfer member 100 configured as described above will be described.

As illustrated in FIG. 1, a seat belt anchor 110 holding a seat belt (not illustrated) is disposed in a laterally rear end of the seat 1 of the embodiment disclosed here. Therefore, during a forward collision of a vehicle, a load applied to such an extent that the second upper rail 32 is raised integrally with the seat 1 supported upward, that is, a separation load applied to such an extent that the second upper rail 32 is separated from the second lower rail 31, acts on the second upper rail 32 of the second slide rail 42 arranged on the rear side of the vehicle.

In the embodiment disclosed here, when this separation load acts on the second upper rail 32, the stepped bolt 105 fixed to the upper wall 96 is moved upward with the second upper rail 32. In this manner, the bolt head 105c arranged below the upper wall 63 of the rear bracket 22 comes into contact with the upper wall 63 via the long hole 101 so that the separation load is transferred to the rear bracket 22 via the stepped bolt 105 serving as the load transfer member 100.

As described above, according to the embodiment disclosed here, the following advantageous effects can be obtained.

(1) The cutout portion 70 which is open upward is formed in the bracket support 60 of the upper rail 12 by cutting out the upper wall 56 and both the side walls 55. Then, the nut member 74 which can be screwed to the bolt 71 inserted into the bracket support 60 via the rear end 60b of the bracket support 60 is disposed in the cutout portion 70. In addition, the rear bracket 22 includes the first and second vertical walls 61 and 62 which have the insertion holes 75 and 76 into which the bolt 71 is inserted and which oppose each other. Then, the first vertical wall 61 is fixed to the rear end 60b of the bracket support 60, based on the fastening force of the bolt 71 screwed into the nut member 74. The second vertical wall 62 is arranged at the position where the nut member 74 is interposed between the first vertical wall 61 and the second vertical wall 62, inside the cutout portion 70.

According to the above-described configuration, it is possible to reduce a possibility that the respective vertical walls 61 and 62 may be deflected due to the fastening force of the bolt 71. As a result, both the vertical walls 61 and 62 do not tilt, and the rear bracket 22 can be properly erected on the bracket support 60 of the upper rail 12. Thus, this can ensure highly improved support rigidity. In particular, during the forward collision of the vehicle, the load (separation load) applied to such an extent that the rear bracket 22 is raised integrally with the seat 1 supported upward acts on the rear bracket 22 arranged on the rear side of the vehicle. Therefore, by the rear bracket 22 adopting the above-described fixing structure, it is possible to more reliably support the seat 1. In addition, by the nut member 74 being fixed to the bracket support 60, it is possible to reduce a possibility that contact noise may be generated between the upper rail 12 and the nut member 74 as observed in the related art. Then, this can provide improved quality.

(2) The front bracket 21 includes the third vertical wall 81 which is fixed to the front end 60a of the bracket support 60, based on the fastening force of the second nut member 84 which is fixed to the front end 60a of the bracket support 60 and the second bolt 85 fixedly screwed into the second nut member 84, and the fourth vertical wall 82 which has the contact portion 88 with respect to the upper surface 60s of the bracket support 60.

That is, during a forward collision of the vehicle which generates the greatest separation load, the seat 1 is likely to move forward in a state where the rear end side having the seatback 3 is raised. Then, in this manner, the separation load applied to such an extent that the upper rail 12 is separated upward from the rear end portion 12b side acts on the first slide rail 41 extending in the vehicle longitudinal direction.

That is, the separation load transferred to the bracket support 60 via the front bracket 21 is weaker than the separation load transferred to the bracket support 60 via the rear bracket 22. Accordingly, even in a case of a fixing structure in which only the third vertical wall 81 side is fastened to the bracket support 60 as describe above, it is possible to ensure the support rigidity which can sufficiently withstand the separation load. Then, with regard to a normal seat load acting in a direction in which the upper rail 12 is pressed down, it is possible to stably support the seat 1 upward by distributing the seat load to the fourth vertical wall 82 having a contact portion 88 with respect to an upper surface 60s of the bracket support 60.

Furthermore, according to the above-described configuration, a bracket fixing hole (for example, the cutout portion 70) is not formed for both side walls 55 and the upper wall 56 which configure the bracket support 60. Accordingly, it is possible to prevent the rigidity of the upper rail 12 itself from deteriorating due to forming the hole. Thus, this can allow a cross-sectional shape of the upper rail 12 to be suitably maintained. As a result, it is possible to ensure a smooth relative movement of the upper rail 12 with respect to the lower rail 11.

(3) In the upper rail 12, the support 78 which can support the bolt 71 screwed into the nut member 74 from below is disposed at a position on the front side of the vehicle from the nut member 74.

That is, in a fixing structure in which only the first vertical wall 61 side is fixed to the rear end 60*b* of the bracket support 60 by using the fastening force of the bolt 71, when the load applied to such an extent that the rear bracket 22 is raised upward acts on the rear bracket 22, the bolt 71 is likely to rotate around the nut member 74 (refer to FIG. 7, in the drawing, counterclockwise direction). That is, a force of pressing the distal end 71*a* side downward is applied to the bolt 71. However, according to the above-described configuration, it is possible to support the distal end 71*a* side of the bolt 71 from below by using the support 78 disposed in the upper rail 12. Then, this can ensure more improved support rigidity.

(4) The long hole 101 extending in the extending direction of the second upper rail 32 (and the second lower rail 31) is disposed on the upper wall 63 of the rear bracket 22. Then, the load transfer member 100 including the shaft 103 whose one end side can pass through the long hole 101 fixed to the upper wall 96 of the second upper rail 32, and the flange 104 which is disposed on the other end side of the shaft 103 and which cannot pass through the long hole 101 arranged below the upper wall 63 of the rear bracket 22 is interposed between the rear bracket 22 and the second upper rail 32.

According to the above-described configuration, when the separation load is applied to such an extent that the second upper rail 32 is raised upward, the load transfer member 100 (stepped bolt 105) fixed to the upper wall 96 is likely to move upward with the second upper rail 32. That is, the flange 104 (bolt head 105*c*) of the load transfer member 100 arranged below the upper wall 63 of the rear bracket 22 via the long hole 101 comes into contact with the upper wall 63. Accordingly, the separation load can be transferred to the rear bracket 22. Then, this can lessen the separation load acting on the second upper rail 32, and can suppress deformation of the second upper rail 32. As a result, it is possible to ensure more improved support rigidity.

In addition, as observed in the load transfer member in the related art, in a configuration in which the large diameter portion which cannot pass through the long hole on the bracket side is arranged inside the second upper rail (refer to FIG. 5 in Reference 1), there is a possibility that a gap between the second upper rail and the second lower rail may be changed due to a shaft length of the large diameter portion. Therefore, an error occurs in the shaft length, thereby causing a possibility that a rolling element interposed between the second upper rail and the second lower rail may be squeezed. This causes a possibility that smooth rolling of the rolling element may be hindered. However, according to the above-described configuration, even if the error occurs in the shaft length of the shaft 103, the gap between the second upper rail 32 and the second lower rail 31 is not changed. Thus, this ensures the smooth rolling of the rolling element 99. Accordingly, the second upper rail 32 can be relatively moved more smoothly with respect to the second lower rail 31.

(5) The nut member 74 is welded to the bracket support 60 at a position on the rear side of the vehicle, inside the cutout portion 70, that is, at a position on the rear end 60*b* side to which the first vertical wall 61 of the rear bracket 22 is fixed.

According to the above-described configuration, it is possible to ensure more improved support rigidity, and it is possible to more reliably reduce a possibility that contact noise may be generated between the nut member 74 and the bracket support 60. Then, the welding work is carried out before the rear bracket 22 is assembled. Accordingly, it is possible to efficiently carry out assembly work.

(6) The support 78 is formed by laying the through-pin 79 serving as the shaft-shaped member between both the side walls 55 in a state where the through-pin 79 penetrates both the side walls 55 of the upper rail 12. This enables a simple configuration to form the support 78 which can reliably support the distal end 71*a* side of the bolt 71 from below.

(7) The terminal plate 73 serving as the plate-shaped member which has the insertion hole 72 into which the bolt 71 is inserted is disposed in the rear end 60*b* of the bracket support 60. In this manner, it is possible to more reliably fix the first vertical wall 61 of the rear bracket 22 to the rear end 60*b* of the bracket support 60, based on the fastening force of the bolt 71 screwed into the nut member 74.

(8) The cutout portions 77 and 89 which have the flared shape of widening toward the opening side and are open to the lower end are respectively formed on the second vertical wall 62 and the fourth vertical wall 82 of the respective brackets 20.

According to the above-described configuration, the bracket support 60 is inserted into the cutout portions 77 and 89, thereby enabling the respective brackets 20 to be easily assembled to the bracket support 60.

The above-described embodiments may be modified as follows.

In the above-described embodiment, the lower rail 11 and the upper rail 12 which configure the first slide rail 41 extend in the vehicle longitudinal direction, and the second lower rail 31 and the second upper rail 32 which configure the second slide rail 42 extend in the vehicle width direction. However, without being limited thereto, the extending direction of the first slide rail 41 may not necessarily be the vehicle longitudinal direction. Furthermore, also the extending direction of the second slide rail 42 may not necessarily be the vehicle width direction, as long as the second slide rail 42 extends in a direction intersecting the first slide rail 41. Then, the fixing structure of the respective brackets 20 with respect to the upper rail 12 may also be applied to a case where a seat is fixed to the respective brackets 20 without interposing the second slide rail 42 therebetween.

In the above-described embodiment, the upper rail 12 has a shape in which both the side walls 55 and the upper wall 56 are largely cut out in the front end portion 12*a* and the rear end portion 12*b*. Then, both the side walls 55 and the upper wall 56 which remain in the center portion serve as the bracket support 60, thereby supporting the respective brackets 20 (21 and 22) upward. However, without being limited thereto, both the side walls 55 and the upper wall 56 may have a length which is the same as that of the folded portion 57 moving inside the lower rail 11.

In the above-described embodiment, the seat slide device 10 includes two brackets 20 of the front bracket 21 and the rear bracket 22. However, without being limited thereto, the number of the brackets 20 may be one. Then, in this case, the fixing structure using the rear bracket 22 according to the above-described embodiment may be adopted. In addition, the number of the brackets 20 may be three or more. In this case, the bracket 20 arranged on the rearmost side of the vehicle may adopt the fixing structure of the rear bracket 22 according to the above-described embodiment. Then, in a configuration having multiple brackets 20, the bracket 20 arranged on the frontmost side of the vehicle may adopt the fixing structure of the rear bracket 22 according to the above-described embodiment. In this case, the "terminal of the bracket support to which the first vertical wall is fixed" is the front end of the bracket support, as a matter of course.

In the above-described embodiment, the nut member 74 is fixed at a position on the rear side of the vehicle, inside the cutout portion 70, by means of welding. However, a configuration may be adopted in which the nut member 74 is fastened in the axial direction by the fastening force of the bolt 71. Similarly, the terminal plate 73 may also adopt a configuration in which the terminal plate 73 is co-fastened between the bolt head and the rear end 60*b* of the bracket support 60, based on the fastening force of the bolt 71 and the nut member 74.

In the above-described embodiment, the cutout portions 77 and 89 which have the flared shape of widening toward the opening side and are open to the lower end are respectively formed on the second vertical wall 62 and the fourth vertical wall 82 of the respective brackets 20. However, without being limited thereto, any bracket 20 may be arbitrarily selected and set to have the cutout portion formed in the lower end of the second vertical wall and the fourth vertical wall. In addition, the flared shape may be arbitrarily changed. Then, a configuration may be adopted in which the cutout portion is not disposed in the lower end of the second vertical wall and the fourth vertical wall.

In the above-described embodiment, the load transfer member 100 is interposed between the rear bracket 22 and the second upper rail 32 on the second slide rail 42 side supported by the rear bracket 22. However, without being limited thereto, the load transfer member 100 may be interposed between any bracket 20 and the second upper rail 32 disposed above the bracket 20.

In addition, the load transfer member 100 is not necessarily limited to the stepped bolt 105. Then, a shape of the shaft 103 and the flange 104 may also be arbitrarily changed.

In the above-described embodiment, the long hole 102 which corresponds to the long hole 101 on the rear bracket 22 side and has substantially the same shape is formed on the bottom wall 91 of the second lower rail 31. The long hole 102 has the groove width D0' which is substantially equal to the groove width D0 of the long hole 101 on the rear bracket 22 side. However, without being limited thereto, as long as the relative movement of the shaft 103 of the load transfer member 100 is not hindered with respect to the long hole 101 on the rear bracket 22 side, a hole shape of the long hole 102 formed on the bottom wall 91 of the second lower rail 31 may be arbitrarily changed.

In the above-described embodiment, the support 78 is formed by laying the through-pin 79 serving as the shaft-shaped member between both the side walls 55 in a state where the through-pin 79 penetrates both the side walls 55 of the upper rail 12. However, without being limited thereto, the configuration of the support 78 may be arbitrarily changed.

In the above-described embodiment, the respective brackets 20 (21 and 22) respectively include the covers (64 and 87). However, a configuration without these covers may be adopted.

Next, technical ideas and advantageous effects which can be understood from the above-described embodiments will be described.

(a) In the vehicle seat slide device, the nut member is welded to the bracket support at the position on the terminal side to which the first vertical wall is fixed, inside the cutout portion.

According to the above-described configuration, it is possible to ensure more improved support rigidity, and it is possible to more reliably reduce a possibility that contact noise may be generated between the nut member and the bracket support. Then, the welding work is carried out before the bracket is assembled. Accordingly, it is possible to efficiently carry out assembly work.

(b) In the vehicle seat slide device, the support is the shaft-shaped member which is laid between both the side walls. This enables a simple configuration to form the support which can reliably support the distal end side of the bolt from below.

(c) In the vehicle seat slide device, the plate-shaped member having the insertion hole into which the bolt is inserted is disposed in the terminal of the bracket support to which the first vertical wall is fixed. In this manner, it is possible to more reliably fix the first vertical wall of the bracket to the terminal of the bracket support, based on the fastening force of the bolt screwed into the nut member.

(d) In the vehicle seat slide device, the cutout portion which has the flared shape of widening toward the opening side and is open to the lower end is formed on the second vertical wall. The bracket support is inserted into the cutout portion disposed in the lower end of the second vertical wall, thereby enabling the bracket to be easily assembled to the bracket support.

An aspect of this disclosure is directed to a vehicle seat slide device including an upper rail that includes a bracket support having a pair of side walls and an upper wall connecting upper ends of the respective side walls, a lower rail that supports the upper rail so as to be relatively movable, and a bracket that is fixed to the bracket support. A cutout portion which is open upward is formed in the bracket support by cutting out the upper wall and the respective side walls. A nut member which is screwed to a bolt inserted into the bracket support via a terminal of the bracket support is disposed in the cutout portion. The bracket includes first and second vertical walls which have an insertion hole into which the bolt is inserted, and which oppose each other. The first vertical wall is fixed to the terminal of the bracket support, based on a fastening force of the bolt screwed into the nut member. The second vertical wall is arranged inside the cutout portion at a position where the nut member is interposed between the first vertical wall and the second vertical wall.

According to the above-described configuration, it is possible to reduce a possibility that the respective vertical walls may be deflected due to the fastening force of the bolt. As a result, both the vertical walls do not tilt, and the bracket can be properly erected on the bracket support of the upper rail. Then, this can ensure improved support rigidity. In addition, since the nut member is fixed to the bracket support, it is possible to reduce a possibility that contact noise may be generated between the upper rail and the nut member as observed in the related art. Then, this can provide improved quality.

In the vehicle seat slide device of the aspect of this disclosure, it is preferable that the terminal of the bracket support to which the first vertical wall is fixed is a rear end of the bracket support extending in a vehicle longitudinal direction.

That is, during a forward collision of a vehicle, the bracket arranged on a rear side of the vehicle receives a load (separation load) applied to such an extent that the bracket is raised integrally with the seat supported upward by the bracket. In this regard, according to the above-described configuration, it is possible to ensure more improved support rigidity for the bracket arranged on the rear side of the vehicle. As a result, it is possible to more reliably support the seat.

In the vehicle seat slide device of the aspect of this disclosure, it is preferable that the vehicle seat slide device includes a front bracket that is fixed to a front end side of the bracket support, and the front bracket includes a third vertical wall which is fixed to the front end of the bracket support, based on a fastening force of a second nut member which is fixed to a front end of the bracket support and a second bolt fixedly screwed into the second nut member, and a fourth vertical wall which has a contact portion with respect to an upper surface of the bracket support.

That is, during the forward collision of the vehicle which generates the greatest separation load, the seat is likely to move forward in a state where the rear end side having a seatback thereof is raised. Then, in this manner, the separation load applied to such an extent that the upper rail is separated upward from the rear end side acts on the upper rail extending in the vehicle longitudinal direction.

That is, the separation load transferred to the bracket support via the front bracket is weaker than the separation load transferred to the bracket support via the rear bracket. Accordingly, even in a case where the front bracket has a fixing structure in which only the third vertical wall side is fastened to the bracket support, it is possible to ensure the support rigidity which can sufficiently withstand the separation load. Then, with regard to a normal seat load acting in a direction in which the upper rail is pressed down, it is possible to stably support the seat upward by distributing the seat load to the fourth vertical wall having a contact portion with respect to an upper surface of the bracket support.

Furthermore, according to the above-described configuration, a bracket fixing hole is not formed for both the side walls and the upper wall which configure the bracket support. Accordingly, it is possible to prevent the rigidity of the upper rail itself from deteriorating due to forming the hole. This can allow a cross-sectional shape of the upper rail to be suitably maintained. As a result, it is possible to ensure a smooth relative movement of the upper rail with respect to the lower rail.

In the vehicle seat slide device of the aspect of this disclosure, it is preferable that in the upper rail, a support which support the bolt screwed into the nut member from below is disposed at a position farther away from the first vertical wall than the nut member.

That is, in a fixing structure in which only the first vertical wall side is fixed to the terminal of the bracket support by using the fastening force of the bolt, when the load applied to such an extent that the bracket is raised upward acts on the bracket, the bolt is likely to rotate around the nut member. That is, a force of pressing a distal end side of the bolt downward is applied to the bolt. However, according to the above-described configuration, it is possible to support the distal end side of the bolt from below by using the support disposed in the upper rail. Then, this can ensure more improved support rigidity.

In the vehicle seat slide device of the aspect of this disclosure, it is preferable that the support is a shaft-shaped member which is laid between both the side walls.

In the vehicle seat slide device of the aspect of this disclosure, it is preferable that the bracket supports a second upper rail and a second lower rail which have an upper wall connecting the first and second vertical walls, and which extend in a direction intersecting the extending direction of the upper rail and the lower rail above the upper wall, a long hole extending in the extending direction of the second upper rail may be disposed on the upper wall of the bracket, and a load transfer member including a shaft having a shape which can pass through the long hole and whose one end side is fixed to the upper wall of the second upper rail, and a flange disposed on the other end side of the shaft and having a shape which cannot pass through the long hole arranged below the upper wall of the bracket is interposed between the bracket and the second upper rail.

According to the above-described configuration, when the separation load is applied to such an extent that the second upper rail is raised upward, the load transfer member fixed to the upper wall is likely to move upward with the second upper rail. That is, the flange of the load transfer member arranged below the upper wall of the bracket via the long hole comes into contact with the upper wall. Accordingly, the separation load can be transferred to the bracket. Then, this can lessen the separation load acting on the second upper rail, and can prevent deformation of the second upper rail. As a result, it is possible to ensure more improved support rigidity.

In addition, as observed in the load transfer member in the related art, in a configuration in which the large diameter portion which cannot pass through the long hole on the bracket side is arranged inside the second upper rail (refer to FIG. 5 in Reference 1), there is a possibility that a gap between the second upper rail and the second lower rail may be changed due to a shaft length of the large diameter portion. Therefore, an error occurs in the shaft length, thereby causing a possibility that a rolling element interposed between the second upper rail and the second lower rail may be squeezed. This causes a possibility that smooth rolling of the rolling element may be hindered. However, according to the above-described configuration, even if the error occurs in the shaft length of the shaft, the gap between the second upper rail and the second lower rail is not changed. Then, this ensures the smooth rolling of the rolling element. Accordingly, the second upper rail can be relatively moved more smoothly with respect to the second lower rail.

In the vehicle seat slide device of the aspect of this disclosure, it is preferable that the nut member is welded to the bracket support at a position on the terminal side to which the first vertical wall is fixed inside the cutout portion.

In the vehicle seat slide device of the aspect of this disclosure, it is preferable that a plate-shaped member having an insertion hole into which the bolt is inserted is disposed in the terminal of the bracket support to which the first vertical wall is fixed.

In the vehicle seat slide device of the aspect of this disclosure, it is preferable that a cutout portion which has a flared shape of widening toward an opening side and which is open to a lower end is formed on the second vertical wall.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle seat slide device comprising:
   an upper rail that includes a bracket support having a pair of side walls and an upper wall connecting upper ends of the respective side walls;
   a lower rail that supports the upper rail so as to be relatively movable; and
   a bracket that is fixed to the bracket support,
   wherein a cutout portion which is open upward is formed in the bracket support by cutting out the upper wall and the respective side walls,
   wherein a nut member which is screwed to a bolt inserted into the bracket support via a terminal of the bracket support is disposed in the cutout portion,
   wherein the bracket includes first and second vertical walls which have an insertion hole into which the bolt is inserted, and which oppose each other,
   wherein the first vertical wall is fixed to the terminal of the bracket support, based on a fastening force of the bolt screwed into the nut member, wherein the second vertical wall is arranged inside the cutout portion at a position where the nut member is interposed between the first vertical wall and the second vertical wall, and wherein in the upper rail, a support which supports the bolt screwed into the nut member from below is disposed at a position farther away from the first vertical wall than the nut member.

2. The vehicle seat slide device according to claim 1, wherein the terminal of the bracket support to which the first vertical wall is fixed is a rear end of the bracket support extending in a vehicle longitudinal direction.

3. The vehicle seat slide device according to claim 2, further comprising:

a front bracket that is fixed to a front end side of the bracket support, wherein the front bracket includes, a third vertical wall which is fixed to the front end side of the bracket support, based on a fastening three of a second nut member which is fixed to the front end side of the bracket support and a second bolt fixedly screwed into the second nut member, and a fourth vertical wall which has a contact portion with respect to an upper surface of the bracket support.

4. The vehicle seat slide device according to claim 1, wherein the support is a shaft-shaped member which is laid between the side walls.

5. The vehicle seat slide device according to claim 1, wherein the bracket supports a second upper rail and a second lower rail which have an upper wall connecting the first and second vertical walls, and which extend in a direction intersecting the extending direction of the upper rail and the lower rail above the upper wall;

a long hole extending in the extending direction of the second upper rail is disposed on the upper wall of the bracket; and a load transfer member including a shaft having a shape which can pass through the long hole and whose one end side is fixed to the upper wall of the second upper rail, and a flange disposed on the other end side of the shaft and having a shape which cannot pass through the long hole arranged below the upper wall of the bracket is interposed between the bracket and the second upper rail.

6. The vehicle seat slide device according to claim 1, wherein the nut member is welded to the bracket support at a position on a terminal side to which the first vertical wall is fixed inside the cutout portion.

7. The vehicle seat slide device according to claim 1, wherein a plate-shaped member having an insertion hole into which the bolt is inserted is disposed in the terminal of the bracket support to which the first vertical wall is fixed.

8. The vehicle seat slide device according to claim 1, wherein a cutout portion which has a flared shape of widening toward an opening side and which is open to a lower end is formed on the second vertical wall.

\* \* \* \* \*